US010547558B2

(12) United States Patent
Chan et al.

(10) Patent No.: US 10,547,558 B2
(45) Date of Patent: Jan. 28, 2020

(54) METHODS, SYSTEMS AND APPARATUS FOR DYNAMIC DISCARD TIMER

(71) Applicant: APPLE INC., Cupertino, CA (US)

(72) Inventors: An Chan, San Jose, CA (US); Soo Young Lee, Cupertino, CA (US); Abhishek A. Bhonsle, San Jose, CA (US); Anish K. Goyal, Milpitas, CA (US); Madhusudan Chaudhary, Campbell, CA (US); Wanping Zhang, San Jose, CA (US); Tahir Shamim, San Jose, CA (US); Raghuveer Mallikarjunan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 15/609,316

(22) Filed: May 31, 2017

(65) Prior Publication Data

US 2018/0351873 A1    Dec. 6, 2018

(51) Int. Cl.
*H04L 12/823* (2013.01)
*H04W 28/02* (2009.01)
*H04W 28/14* (2009.01)

(52) U.S. Cl.
CPC ......... *H04L 47/32* (2013.01); *H04W 28/0278* (2013.01); *H04W 28/14* (2013.01)

(58) Field of Classification Search
CPC .. H04L 47/32; H04L 49/901; H04W 28/0278; H04W 28/14
See application file for complete search history.

(56) References Cited

U.S. PATENT DOCUMENTS

| | | | |
|---|---|---|---|
| 2008/0192623 A1* | 8/2008 | Chen ................... | H04M 7/1295 370/212 |
| 2010/0034187 A1* | 2/2010 | Kumar .................. | H04L 47/14 370/345 |
| 2012/0201205 A1* | 8/2012 | Gopalakrishnan .... | H04L 1/1816 370/329 |
| 2015/0172197 A1* | 6/2015 | Sun ......................... | H04L 47/32 370/389 |
| 2015/0282086 A1* | 10/2015 | Gupta .................. | H04W 52/0229 455/574 |

* cited by examiner

*Primary Examiner* — Sharad Rampuria
(74) *Attorney, Agent, or Firm* — Fay Kaplun & Marcin, LLP (57) ABSTRACT

Methods, systems and apparatus for a user equipment to implement a dynamic discard timer. The user equipment may generate a packet for transmission and store the packet in a buffer of the user equipment. The user equipment may then generate a timeout value for a discard timer for the buffer, where the discard timer discards the packet from the buffer when the timeout value is reached. After a predetermined amount of time, the user equipment may determine whether the packet has been discarded from the buffer and, when it is determined that the packet has not been discarded from the buffer, update the timeout value.

20 Claims, 4 Drawing Sheets

METHODS, SYSTEMS AND APPARATUS FOR DYNAMIC DISCARD TIMER

BACKGROUND

A packet data convergence protocol ("PDCP") discard timer is related to the delay between generation of a packet and actual transmission of the generated packet. That is, it is a time duration for which a PDCP packet's corresponding Radio Link Control ("RLC") packet segments are stored in a RLC buffer before being assigned uplink resources and transmitted. The discard timer specifies a timeout value (e.g., an upper limit or maximum time/period/duration) for which a packet (or packet segment) may remain in the RLC buffer before the packet is discarded. The timeout value may be configured by an eNodeB of an attached LTE network. For example, the eNodeB may configure the timeout value to be 100 ms. If the packet remains in the RLC buffer longer than the timeout value specified by the protocol (e.g., 100 ms), the packet is discarded.

Once the timeout value is configured, it remains fixed despite changes to channel conditions. Thus, when the timeout value is configured to be, for example, 100 ms, all packets generated for transmission will remain in the RLC buffer for up to 100 ms regardless of varying channel conditions. This may cause an undesired early discard of packets or congestion in the buffer. As such, a dynamic discard timer with the timeout value configured to change in view of channel conditions is desirable.

SUMMARY

Described herein are methods, systems and apparatus for a dynamic discard timer. In a first aspect, a method is disclosed where a user equipment generates a packet for transmission and stores the packet in a buffer of the user equipment. The method may further comprise the user equipment generating a timeout value for a discard timer for the buffer, where the discard timer discards the packet from the buffer when the timeout value is reached. After a predetermined amount of time, the method may comprise the user equipment determining whether the packet has been discarded from the buffer and, when it is determined that the packet has not been discarded from the buffer, update the timeout value.

In a second aspect, a user equipment is disclosed. The user equipment may have an application processor for generating a packet for transmission. The user equipment may further have a baseband processor in communication with the application processor, the baseband processor receiving the packet from the application processor and storing the packet in a buffer of the baseband processor. A timeout value may be associated with the buffer and the packet may be discarded when the timeout value is reached. The baseband processor may wait a predetermined amount of time and determine whether the packet has been discarded from the buffer. When it is determined that the packet has not been discarded from the buffer, the user equipment may update the timeout value.

In a third aspect, an integrated circuit is disclosed. The integrated circuit may have circuitry to store a packet in a buffer, where a timeout value may be associated with the buffer and the packet may be discarded from the buffer when the timeout value is reached. The integrated circuit may further have circuitry to determine whether the packet has been discarded from the buffer after a predetermined amount of time. When it is determined that the packet has not been discarded from the buffer, the integrated circuit may have circuitry to update the timeout value.

DETAILED DESCRIPTION

The exemplary embodiments may be further understood with reference to the following description and the appended drawings, wherein like elements are referred to with the same reference numerals. The exemplary embodiments describe an apparatus, system and method for a dynamic discard timer within a mobile device, such as a user equipment ("UE") associated with an LTE network. In the exemplary embodiments, the mobile device will be described as a UE associated with LTE networks. However, it will be understood by those skilled in the art that UEs operating in accordance with other network standards may also implement the exemplary embodiments in accordance with the functionalities and principles described herein.

The exemplary embodiments may also be understood with reference to the Open System Interconnection ("OSI") model. The OSI model was established to standardize transmission between points over the Internet or other networks. The OSI model separates the communications processes between two points in a network into seven stacked layers, with each layer adding its own set of functions. There is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware. Typically, the top four layers are used when a message passes from or to a user and the bottom three layers are used when a message passes through a device (e.g., an IP host device). The IP host is any device on the network that is capable of transmitting and receiving IP packets, such as a server, a router or a user device. The layers of the OSI model are as follows.

Layer 7 (the application layer) is a layer at which, for example, communication partners are identified, quality of service is identified, user authentication and privacy are considered, constraints on data syntax are identified, etc. Layer 6 (the presentation layer) is a layer that, for example, converts incoming and outgoing data from one presentation format to another. Layer 5 (the session layer) is a layer that, for example, sets up, coordinates, and terminates conversations, exchanges and dialogs between the applications, etc. Layer-4 (the transport layer) is a layer that, for example, manages end-to-end control and error-checking. Layer-3 (the network layer) is a layer that, for example, handles routing and forwarding. Layer-2 (the data-link layer) is a layer that, for example, provides synchronization for the physical level, does bit-stuffing and furnishes transmission protocol knowledge and management, etc. Layer 1 (the physical layer) is a layer that, for example, conveys the bit stream through the network at the physical level. Those skilled in the art would understand that the application layer, the presentation layer, the session layer and the transport layer may be referred to as the upper layers of the OSI model while the network layer, the data-link layer and the physical layer may be referred to as the lower layers of the OSI model or of a protocol stack.

A PDCP discard timer is related to the delay between generation of a packet at the upper layers and actual transmission of the generated packet at the lower layers. Accordingly, a timeout value of a PDCP discard timer may be either too short or too long. If the timeout value is too short, packets awaiting transmission in the RLC buffer may be discarded too early. This may result in an unnecessary retransmission of packets from an upper layer of a protocol stack (e.g., a transport layer) to the data-link layer of the protocol stack. The early discarding and unnecessary retransmission of packets may cause a delay in data transfer and decrease data throughput, causing a user to be negatively impacted.

It should be noted that in the exemplary embodiments, it will be considered that the data-link layer includes a PDCP sublayer, an RLC sublayer and a Media Access Control ("MAC") sublayer. While reference may be made to a buffer in the RLC sublayer throughout this disclosure, those skilled in the art would understand that the exemplary embodiments presented herein may be applied to any buffer or queue in any layer or sublayer of the OSI model.

If the timeout value is too long, the packet may remain in the buffer after an upper layer timeout occurs or after the packet no longer needs to be transmitted. This results in useless packets remaining in the buffer at the cost of memory and bandwidth. For example, if the upper layers timeout or the application layer gives up trying to transmit the packet, a timeout value that is too long may unnecessarily keep a useless packet in the buffer. Accordingly, the following exemplary embodiments will discuss an apparatus, system and method for implementing a discard timer capable of dynamically altering its timeout value to adapt to changing channel conditions.

Figure 1:
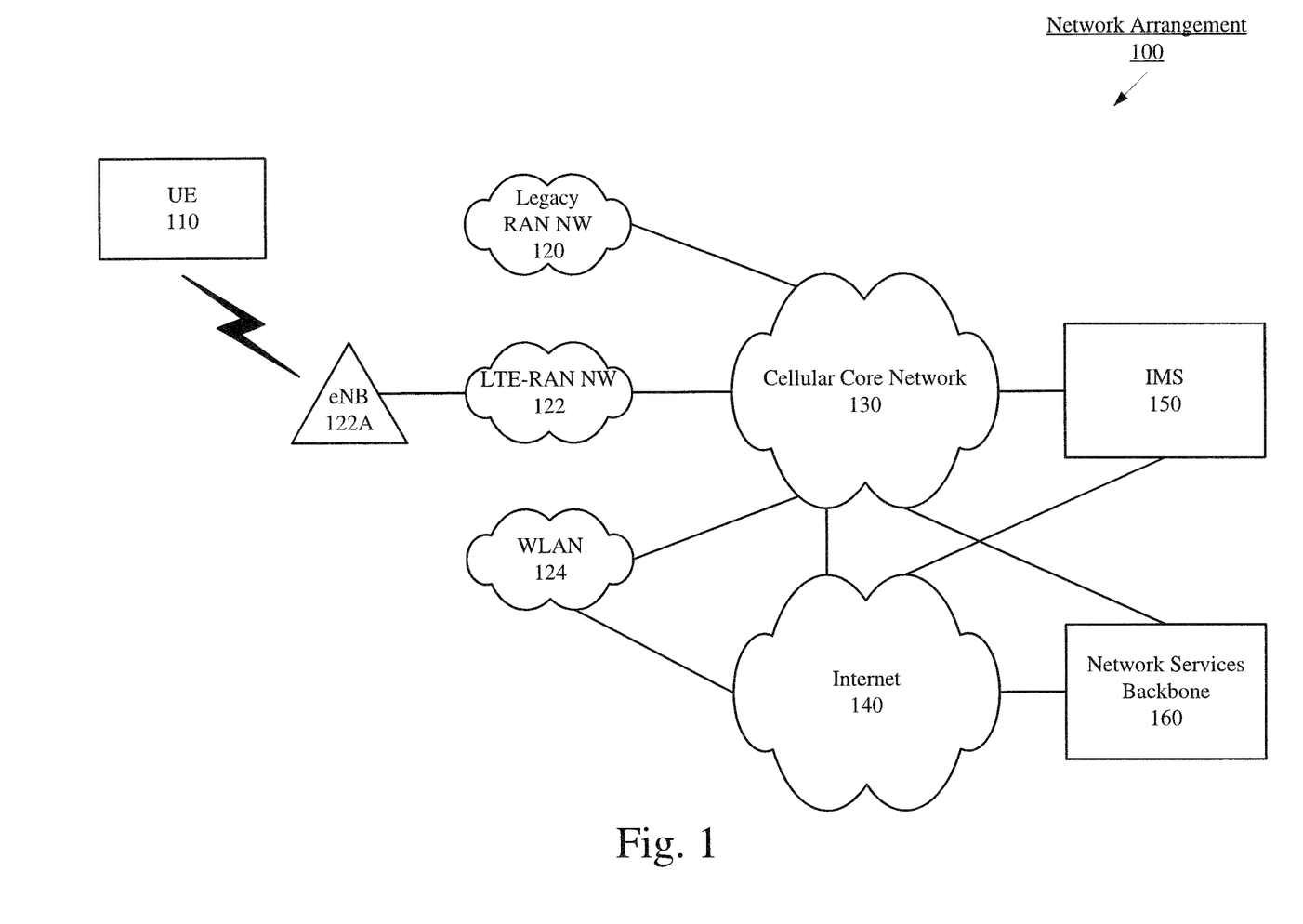
FIG. 1 shows a network arrangement according to various exemplary embodiments described herein.

FIG. 1 shows an exemplary network arrangement 100, according to various embodiments described herein. The exemplary network arrangement 100 includes a UE 110. Those skilled in the art will understand that the UE 110 may be any type of electronic component that is configured to communicate via a network, e.g., smartphones, phablets, embedded devices, wearables, etc. It should also be understood that an actual network arrangement may include any number of UEs. The example of one (1) UE 110 is only provided for illustrative purposes.

The UE 110 may be configured to communicate directly with one or more networks. In this example, the networks with which the UE 110 may communicate are a legacy radio access network (RAN) 120, a Long Term Evolution radio access network (LTE-RAN) network 122 and a wireless local area network (WLAN) 124. In this example, each of the networks 120-124 is a wireless network with which the UE 110 may communicate wirelessly. However, it should be understood that the UE 110 may also communicate with other types of networks using a wired connection. Again, the use of three (3) networks is only exemplary and there may be any other number of networks with which the UE 110 may communicate depending on the chipsets that are provided in the UE 110.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UE 110 to communicate with the WLAN 124.

In addition to the networks 120-124, the network arrangement 100 also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UE 110 using the IP protocol. The IMS 150 may include a variety of components to accomplish this task. For example, a typical IMS 150 includes a Home Subscriber Server (HSS) that stores subscription information for a user of the UE 110. This subscription information is used to provide the correct multimedia services to the user. Other exemplary components of the IMS 150 will be described below, as needed. The IMS 150 may communicate with the cellular core network 130 and the Internet 140 to provide the multimedia services to the UE 110. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the UE 110 to perform functionalities generally associated with computer and cellular networks. For example, the UE 110 may perform voice calls to other parties, may browse the Internet 140 for information, may stream multimedia data, etc.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks. The network services backbone 160 interacts with the UE 110 and/or the networks 120, 122, 124, 130, 140 to provide these extended functionalities.

The network services backbone 160 may be provided by any entity or a set of entities. In one example, the network services backbone 160 is provided by the supplier of one or more of the UE 110. In another example, the network services backbone 160 is provided by the cellular network provider. In still a further example, the network services backbone 160 is provided by a third party unrelated to the cellular network provider or the supplier of the UE 110. It should be noted that the network services backbone 160 may be used to associate the UE 110 with a user account. Further, it should be understood that the network services backbone 160 may include many other components and services that may be used to enhance the operations of the UE 110 and networks.

Figure 2:
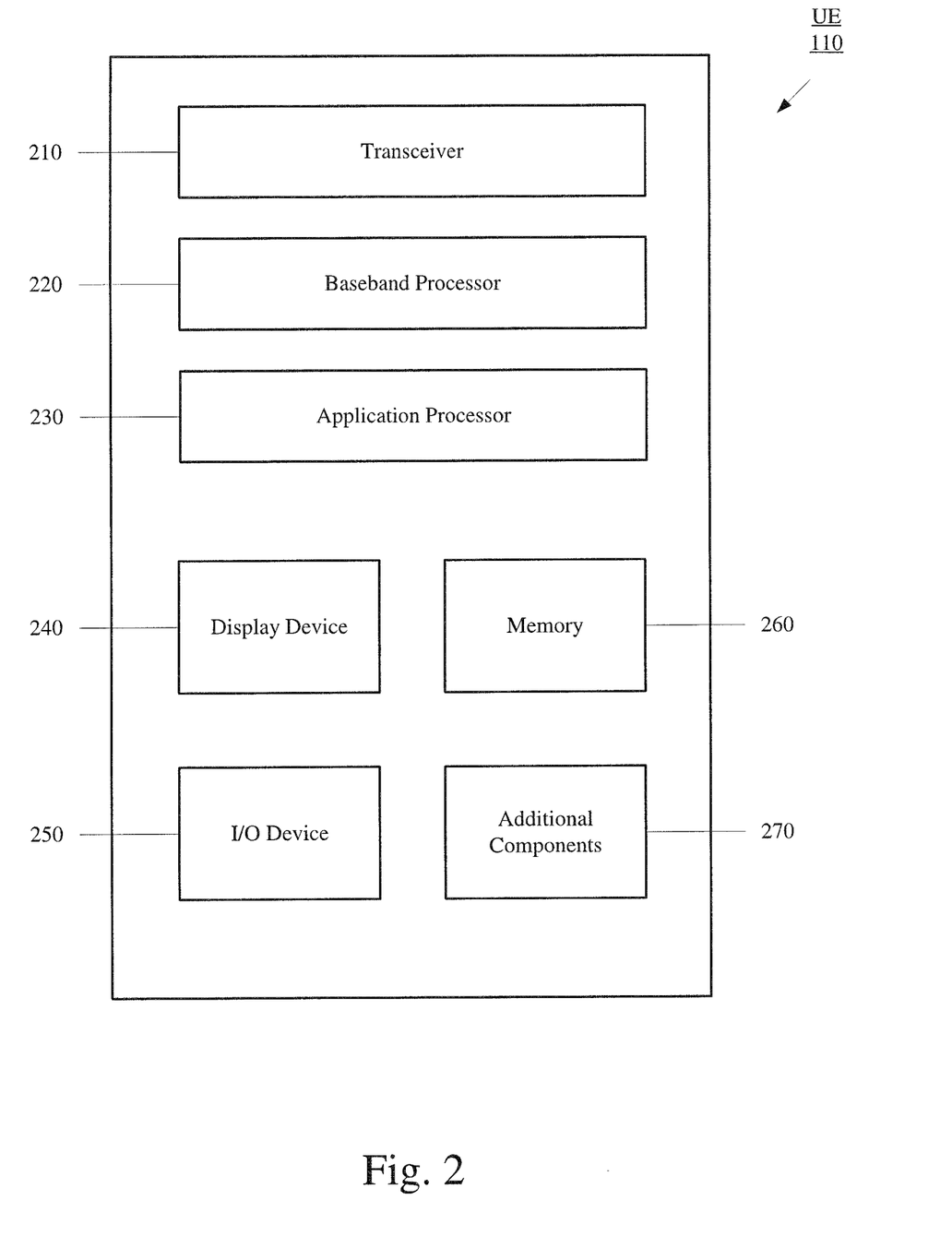
FIG. 2 shows a user equipment according to various exemplary embodiments described herein.

FIG. 2 shows an exemplary UE 110 according to various exemplary embodiments described herein. The UE 110 may represent any electronic device that is configured to perform wireless functionalities. For example, the UE 110 may be a portable device such as a phone, a smartphone, a tablet, a phablet, a laptop, a wearable computing device, etc. In another example, the UE 110 may be a stationary device such as a desktop terminal. The UE 110 may include an antenna (not shown) connected to a transceiver 210, which is connected to a baseband processor 220, which is further connected to an applications processor 230. Those skilled in the art will understand that the baseband processor 220 and the application processor 230 may be incorporated in a single processor, such as, for example, an integrated circuit or chip. The UE 110 may further include a display device 240, an I/O device 250, and a memory arrangement 260 that are accessible by the baseband processor 230 or the applications processor 220. Those skilled in the art will understand that the UE 100 may also include additional components 270, for example, a Bluetooth transceiver, further input devices (e.g., a keypad, a touchscreen, etc.), a battery, etc.

The application processor 230 may be used to perform operations such as, but not limited to, processing input from a user and transmitting data (e.g., packets) to the baseband processor 220. It should be noted that the exemplary embodiments are described as being performed by the application processor 230 and the baseband processor 220. However, either of these components may perform the described functionalities without the other component. In addition, other components may also perform some or all of the functionalities described herein. The application processor 230, the transceiver 210 and the baseband processor 220 may be, for example, general purpose processors, a digital signal processor, an application specific integrated circuit ("ASIC"), another type of integrated circuit and these processors and integrated circuits may execute software programs or firmware.

Figure 3:
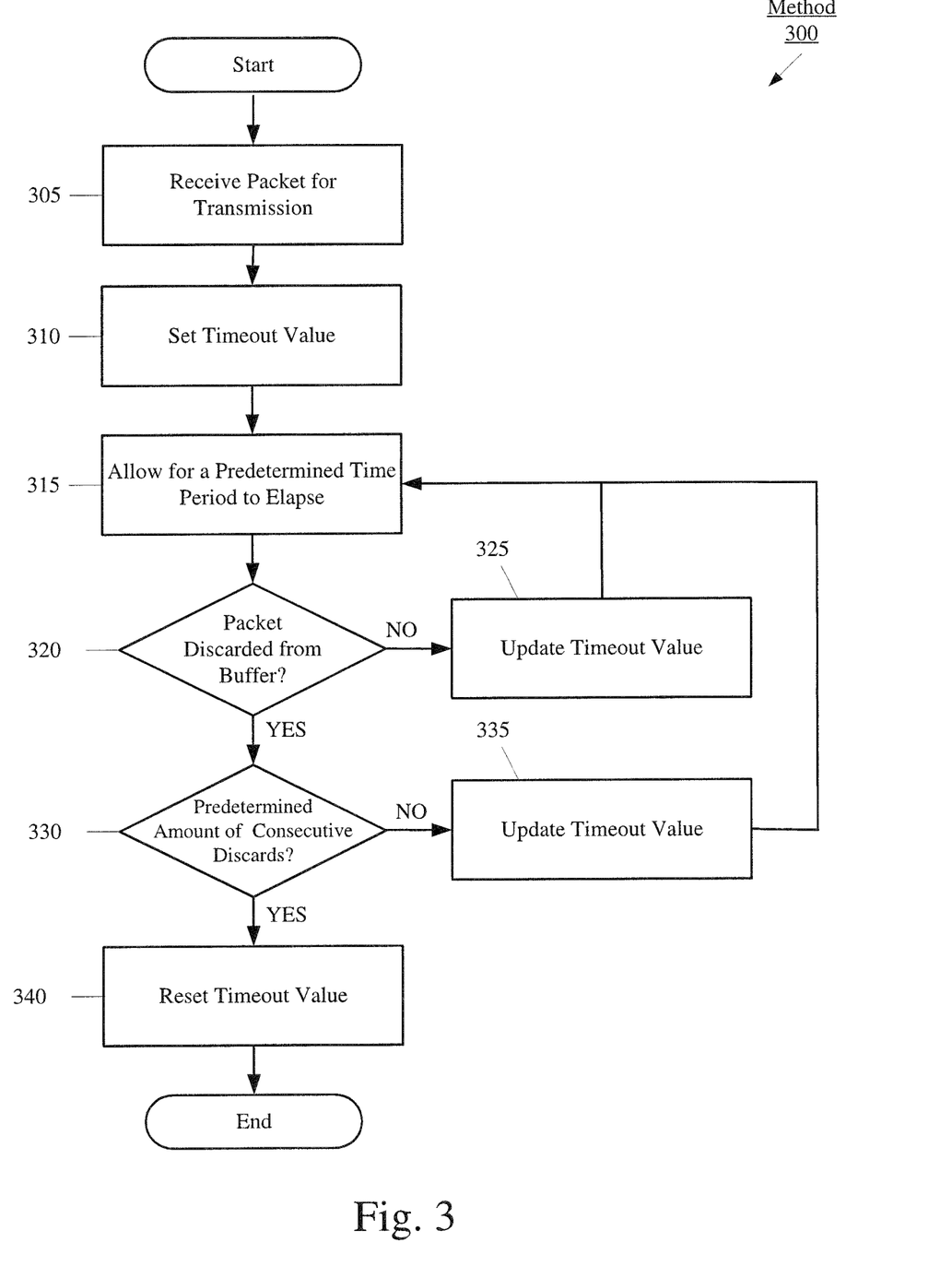
FIG. 3 shows an exemplary method for implementing dynamic discard timer according to various exemplary embodiments described herein.

FIG. 3 shows an exemplary method for implementing a dynamic discard timer according to various embodiments described herein. It is noted that the entirety of method 300 may be performed by a mobile device, such as the UE 110 of FIG. 1, as well as the components of the UE 110, such as the application processor 230 and the baseband processor 220 described with reference to the UE 110 of FIG. 2. However, those skilled in the art would understand that certain functions or the entirety of method 300 may be performed in the eNB 122, or in any other part of the network arrangement 100.

In 305, the baseband processor 220 may receive a packet for transmission from the application processor 230. The packet may be stored in the buffer of the baseband processor 220 while the packet awaits an assignment of resources for transmission by the transceiver 210. For example, the packet may be placed in a queue within the buffer. It should be noted that the buffer may have multiple queues and each of the queues may have its own Radio Resource Control (RRC) connection, multiple queues may share an RRC connection, or any combination thereof.

Figure 4:
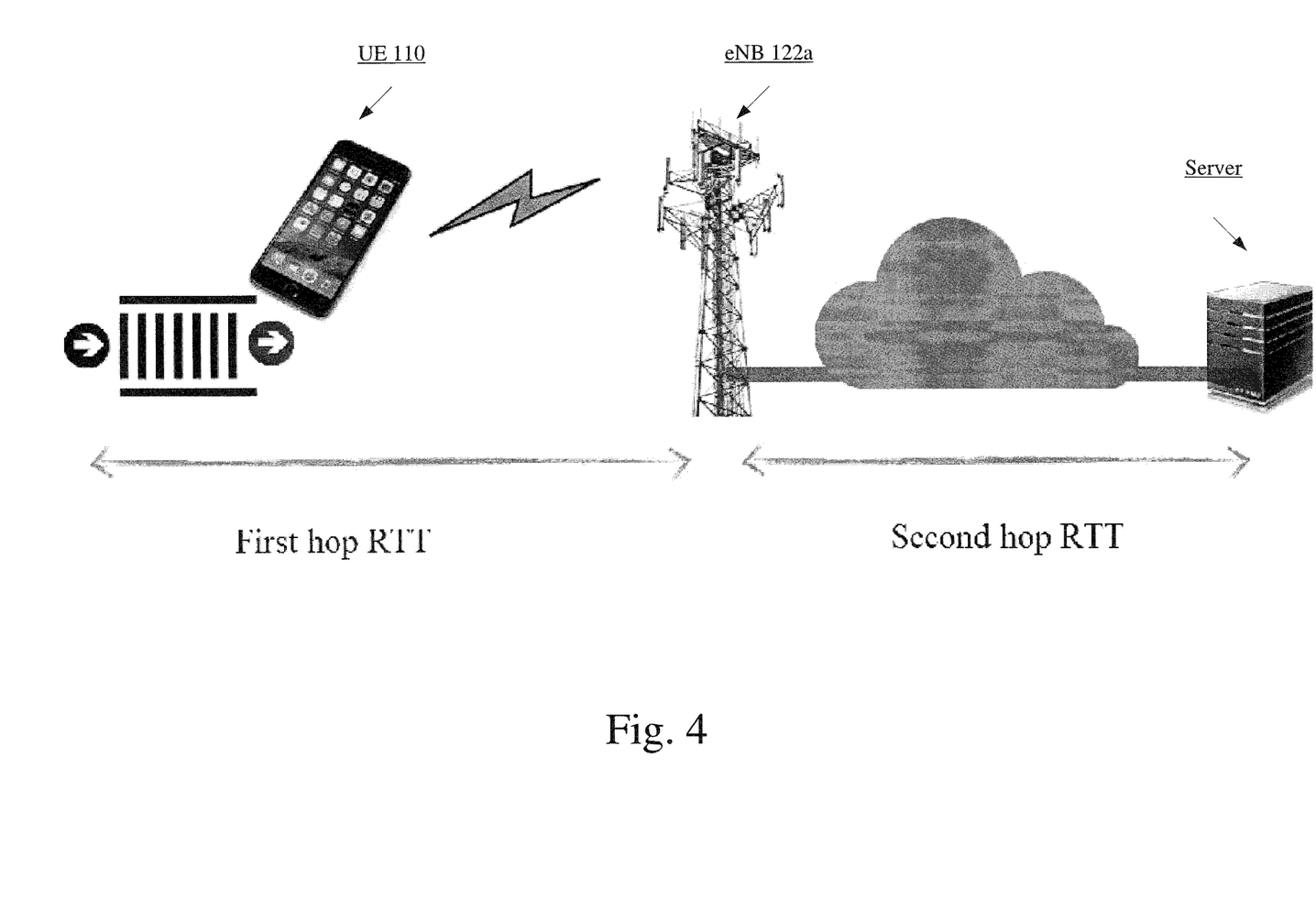
FIG. 4 shows an example of a first and a second hop to various exemplary embodiments described herein.

In 310, the UE 110 may set a timeout value for the dynamic discard timer. The setting of the timeout value may be triggered by the UE 110 booting up, receiving a packet for transmission, receiving a signal from the eNB 122*a* (such as an acknowledgement ("ACK") in response to a previously transmitted packet), etc. The timeout value may be set as a function of a first hop round trip time ("RTT") between the UE 110 and the eNB 122A. In an exemplary embodiment, the first hop RTT may be a PDCP layer delay plus a RLC RTT. The RLC RTT may be a length of time it takes for a signal to be transmitted from the UE 110 to the eNB 122*a* plus a length of time it takes for an ACK in response to the signal to be received by the UE 110 from the eNB 122*a*. FIG. 4 shows an example of the first hop RTT and a second hop RTT, the second hop RTT being between the eNB 122*a* and a server of, for example, one of the networks (e.g., legacy RAN NW 120, LTE-RAN NW 122 and/or WLAN 124), the cellular core network 130, the IMS 150, the network services backbone 160, etc.

In an exemplary embodiment, the timeout value may be determined according to the following:

$$TO = SRTT + k*RTT_{VAR}$$

Wherein: TO=timeout value
SRTT=RTT=smoothed roundtrip time
$RTT_{VAR}$=RTT/2=roundtrip time variation
k=4=a tuning parameter In an exemplary embodiment, the $RTT_{VAR}$ may be calculated or refreshed whenever the first hop RTT is received by the UE 110. In another exemplary embodiment, $RTT_{VAR}$ may be calculated or refreshed whenever the timeout value has expired. The expiration of the timeout value will be discussed in further detail below.

It should be noted that while the above exemplary tuning parameter "k" is set to 4, this value is only exemplary and may be adjusted or changed as desired. Further, while the exemplary embodiments may be described as a function of the first hop RTT, those skilled in the art would understand that the exemplary embodiments may easily be modified to incorporate the RTT of multiple hops, such as, for example, the first hop between the UE 110 and the eNB 122*a* and the second hop between the eNB 122*a* and the server, as seen in FIG. 1 and FIG. 4. It should be noted that any number of hop RTTs between any number of components of the network arrangement 100 may be used. That is, in another example, an end to end RTT may be used to determine the timeout value. The end to end RTT may be from the UE 110 to its destination (e.g., IMS 150, Internet 140, a further UE) and may include the first hop between the UE 110 and the eNB 122*a* and the second hop between the eNB 122*a* and the network, a third hop between the network and the cellular core network, etc.

In 315, a predetermined time period elapses. In an exemplary embodiment, the predetermined time period may be 100 ms. However, it should be understood that 100 ms is only an exemplary time period and the predetermined time period may be set to any desired value.

In 320, it is determined whether the packet has been discarded from the buffer of the baseband processor 220. If the packet has not been discarded from the buffer of the baseband processor 220, the method 300 proceeds to 325, where the timeout value is updated based on updated SRTT and $RTT_{VAR}$ values. In an exemplary embodiment, the timeout value may be updated as follows:

$$TO = SRTT + k*RTT_{VAR}$$

Wherein: $SRTT = \alpha*RTT + (1-\alpha)*SRTT$
$RTT_{VAR} = \beta*RTT_{diff} + (1-\beta)*RTT_{VAR}$
$RTT_{diff} = |RTT - SRTT|$
$\alpha = 0.125 =$ a tuning parameter
$\beta = 0.25 =$ a tuning parameter It should again be noted that while the above exemplary tuning parameters "$\alpha$" and "$\beta$" are set to 0.125 and 0.25, respectively, the values of these parameters may be adjusted or changed as desired. In another exemplary embodiment, the timeout value may be updated to a predetermined value (e.g., 50 ms, 300 ms, etc.).

Once the timeout value has been updated, the method 300 returns to 315 and 320, where the predetermined time period again elapses and the determination may be made as to whether the packet has been discarded from the buffer of the baseband processor 220. If the packet has still not been discarded from the buffer of the baseband processor 220, the method 300 may, once again, proceed to 325 and update the timeout value.

Returning to 320, if the packet has been discarded, the method 300 proceeds to 330, where it is determined whether a predetermined number of packets have been consecutively discarded. For example, in 330 it may be determined whether three packets have been discarded in succession without any packet being transmitted between the discards. Those skilled in the art would understand that the predetermined number of packets may be different packets, the same packet, such as if a packet is discarded and the same packet is retransmitted to the buffer of the baseband processor 220 by the application processor 330, or any combination thereof. It should also be noted that the predetermined number may be any number and that the use of three packets is only exemplary.

When it is determined that the predetermined number of packets have not been consecutively discarded, method 300 proceeds to 335, where the timeout value is again updated. In an exemplary embodiment, the timeout value may be updated as follows:

$$TO_{new} = M*TO$$

Wherein: M=constant

In this exemplary embodiment, the constant M may be set to a value of two (2). However, it should be noted that the value of the constant M may be set to any desired value. It should further be noted that it is preferable to set the constant M to a number greater than one. This is because, at this phase of the method 300, the timeout value is such that at least one packet has been discarded but the predetermined number of consecutively discarded packets has not been reached. This may indicate that the timeout value may be too short, which may trigger an early discard of the packets. By setting the value of the constant to a number greater than 1, the timeout value would dynamically increase, allowing for the packets to have more time to be assigned transmission resources.

It should be noted that, as in 325, the timeout value may be updated to a predetermined value (e.g., 50 ms, 300 ms, etc.) rather that by using the above formula.

Once the timeout value has been updated at 335, the method 300 returns to 315 and 320, where the predetermined time period again elapses and the determination is made as to whether the packet has been discarded from the buffer of the baseband processor 220.

Returning to 330, when it is determined that the predetermined number of packets have been consecutively discarded, method 300 proceeds to 340, where the timeout value is reset. In an exemplary embodiment, the timeout value may be reset using a most recent first hop RTT. In such an embodiment, the method 300 may restart. Alternatively, the timeout value may be reset to a predetermined value or to a value specified by the eNB 122a.

While exemplary embodiments describe the functions of method 300 being performed in the UE 110, it should again be noted that any or all of the functions of method 300 may be performed in any of the components of the network arrangement 100. For example, the timeout value may be determined by the eNB 122A using method 300 and transmitted to the UE 110.

In further exemplary embodiments, the timeout value may be set or updated based on a variety of other factors in conjunction with the RRT hop(s) or independent of the RTT hop(s). In a first exemplary embodiment, a baseband processor 220 buffer/queue size and/or an application processor 230 buffer/queue size may be used to determine the timeout value. For example, a buffer fill percentage (e.g., how full the buffer is) may trigger the implementing of the dynamic discard timer. For example, if the buffer hits a fill threshold (e.g., 20%), the PDCP discard timer may switch from a static discard timer to the dynamic discard timer, as disclosed in method 300. Once the buffer clears to less than the fill threshold, the PDCP discard timer may switch back from the dynamic discard timer to the static discard timer where the discard time is fixed. Alternatively, the fill threshold may change the tuning parameters and/or constants used to determine the timeout value.

In further exemplary embodiments, channel conditions (e.g., reference signal received power ("RSRP"), quality of service ("QoS") and/or throughput may be used to determine the timeout value, set the tuning parameters and/or constants used to determine the timeout value or determine whether to enable/disable the dynamic discard timer. For example, if the QoS falls below a certain threshold, the PDCP discard timer may switch from the static discard timer to the dynamic discard timer, as disclosed in method 300, in order to raise the QoS. Those skilled in the art would understand that any combination of the variety of factors disclosed above may be utilized for any of the disclosed presented above.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
at a user equipment ("UE");
generating a packet for transmission;
storing the packet in a buffer of the UE;
generating a timeout value for a discard timer for the buffer, wherein the packet is discarded from the buffer when the timeout value is reached;
waiting a predetermined amount of time;
determining whether the packet has been discarded from the buffer; and
when it is determined that the packet has not been discarded from the buffer, updating the timeout value from a first duration to a second duration, wherein the first duration is different than the second duration.

2. The method of claim 1, wherein, when it is determined that the packet has been discarded from the buffer, determining whether a predetermined amount of consecutive packets have been discarded from the buffer.

3. The method of claim 2, wherein, when it is determined that the predetermined amount of consecutive packets have not been discarded from the buffer, updating the timeout value from the first duration to a third duration.

4. The method of claim 3, wherein the timeout value is updated by being multiplied by a constant.

5. The method of claim 1, wherein when the timeout value has been updated, the method further comprises:
waiting the predetermined amount of time; and
determining whether the packet has been discarded from the buffer.

6. The method of claim 1, wherein the timeout value is generated according to the following formula:

$$\text{the timeout value} = \text{SRTT} + k*\text{RTT}_{VAR}$$

wherein: SRTT=a smoothed roundtrip time
$\text{RTT}_{VAR}$=a roundtrip time variation
k=a first tuning parameter.

7. The method of claim 1, wherein the timeout value is updated according to the following formula:

$$\text{the updated timeout value} = \text{SRTT} + k*\text{VAR}_{RTT}$$

wherein: SRTT=$\alpha$*RTT+(1−$\alpha$)*SRTT
$\text{RTT}_{VAR}=\beta*\text{RTT}_{diff}+(1-\beta)*\text{RTT}_{VAR}$
$\text{RTT}_{diff}=|\text{RTT}-\text{SRTT}|$
$\alpha$=a second tuning parameter
$\beta$=a third tuning parameter.

8. A user equipment ("UE"), comprising:
an application processor generating a packet for transmission; and
a baseband processor in communication with the application processor, the baseband processor receiving the packet from the application processor and storing the packet in a buffer of the baseband processor;
wherein a timeout value is associated with the buffer and the packet is discarded when the timeout value is reached, and
wherein the baseband processor waits a predetermined amount of time and determines whether the packet has been discarded from the buffer and when it is determined that the packet has not been discarded from the buffer, updates the timeout value from a first duration to a second duration, wherein the first duration is different than the second duration.

9. The UE of claim 8, wherein, when the baseband processor determines that the packet has been discarded from the buffer, the baseband processor further determines whether a predetermined amount of consecutive packets have been discarded from the buffer.

10. The UE of claim 9, wherein, when the baseband processor determines that the predetermined amount of consecutive packets have not been discarded from the buffer, the baseband processor updates the timeout value from the first duration to a third duration.

11. The UE of claim 10, wherein the timeout value is updated by being multiplied by a constant.

12. The UE of claim 8, wherein, when the baseband processor updates the timeout value, the baseband possessor is further configured to wait the predetermined amount of time and determine whether the packet has been discarded from the buffer.

13. The UE of claim 8, wherein the timeout value is generated according to the following formula:

$$\text{the timeout value} = \text{SRTT} + k*\text{RTT}_{VAR}$$

wherein: SRTT=a smoothed roundtrip time
$\text{RTT}_{VAR}$=a roundtrip time variation
k=a first tuning parameter.

14. The UE of claim 8, wherein the timeout value is updated according to the following formula:

$$\text{the updated timeout value} = \text{SRTT} + k*\text{RTT}_{VAR}$$

wherein: SRTT=$\alpha$*RTT+(1−$\alpha$)*SRTT
$\text{RTT}_{VAR}=\beta*\text{RTT}_{diff}+(1-\beta)*\text{RTT}_{VAR}$
$\text{RTT}_{diff}=|\text{RTT}-\text{SRTT}|$
$\alpha$=a second tuning parameter
$\beta$=a third tuning parameter.

15. An integrated circuit, comprising:
circuitry to store a packet in a buffer, wherein a timeout value is associated with the buffer, wherein the packet is discarded from the buffer when the timeout value is reached;
circuitry to determine whether the packet has been discarded from the buffer after a predetermined amount of time; and
when it is determined that the packet has not been discarded from the buffer, circuitry to update the timeout value from a first duration to a second duration, wherein the first duration is different than the second duration.

16. The integrated circuit of claim 15, further comprising:
when it is determined that the packet has been discarded from the buffer, circuitry to determine whether a predetermined amount of consecutive packets have been discarded from the buffer.

17. The integrated circuit of claim 16, further comprising:
when it is determined that the predetermined amount of consecutive packets have not been discarded from the buffer, circuitry to update the timeout value from the first duration to a third duration.

18. The integrated circuit of claim 15, further comprising:
wherein when the timeout value has been updated;
circuitry to wait the predetermined amount of time; and
circuitry to determine whether the packet has been discarded from the buffer.

19. The integrated circuit of claim 15, wherein the timeout value is generated according to the following formula:

$$\text{the timeout value} = \text{SRTT} + k*\text{RTT}_{VAR}$$

wherein: SRTT=a smoothed roundtrip time
$\text{RTT}_{VAR}$=a roundtrip time variation
k=a first tuning parameter.

20. The integrated circuit of claim 15, wherein the timeout value is updated according to the following formula:

the updated timeout value=$SRTT+k*RTT_{VAR}$ wherein: $SRTT=\alpha*RTT+(1-\alpha)*SRTT$
$RTT_{VAR}=\beta*RTT_{diff}+(1\beta\beta)*RTT_{VAR}$
$RTT_{diff}=|RTT-SRTT|$
$\alpha$=a second tuning parameter
$\beta$=a third tuning parameter.

* * * * *

UNITED STATES PATENT AND TRADEMARK OFFICE
CERTIFICATE OF CORRECTION

PATENT NO. : 10,547,558 B2  
APPLICATION NO. : 15/609316  
DATED : January 28, 2020  
INVENTOR(S) : Chan et al.

Page 1 of 1

It is certified that error appears in the above-identified patent and that said Letters Patent is hereby corrected as shown below:

In the Claims

Claim 20, Column 11, Line 5:
"$RTT_{VAR} = \beta * RTT_{diff} + (1\beta\beta) * RTT_{VAR}$" should read "$RTT_{VAR} = \beta * RTT_{diff} + (1-\beta) * RTT_{VAR}$"

Signed and Sealed this
Third Day of March, 2020

Andrei Iancu
*Director of the United States Patent and Trademark Office*